US010514968B2

(12) United States Patent
Araya

(10) Patent No.: US 10,514,968 B2
(45) Date of Patent: Dec. 24, 2019

(54) INFORMATION PROCESSING SYSTEM AND INFORMATION PROCESSING METHOD

(71) Applicant: KYOCERA Document Solutions Inc., Osaka-shi, Osaka (JP)

(72) Inventor: Takeshi Araya, Osaka (JP)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 0 days.

(21) Appl. No.: 16/204,590

(22) Filed: Nov. 29, 2018

(65) Prior Publication Data

US 2019/0171504 A1 Jun. 6, 2019

(30) Foreign Application Priority Data

Nov. 28, 2017 (JP) .................................. 2017-227402

(51) Int. Cl.
*G06F 9/44* (2018.01)
*G06F 9/54* (2006.01)
(52) U.S. Cl.
CPC ................... *G06F 9/547* (2013.01)
(58) Field of Classification Search
CPC ............................................... G06F 9/45558
USPC ....................................................... 719/328
See application file for complete search history.

(56) References Cited

U.S. PATENT DOCUMENTS

| 2014/0059226 | A1* | 2/2014 | Messerli | G06F 9/5072 |
| | | | | 709/226 |
| 2015/0317331 | A1* | 11/2015 | Thomas | G06F 8/35 |
| | | | | 707/792 |
| 2018/0176268 | A1* | 6/2018 | Malatesha | G06F 3/0481 |

FOREIGN PATENT DOCUMENTS

JP 2000-086871 10/2001

* cited by examiner

*Primary Examiner* — Timothy A Mudrick
(74) *Attorney, Agent, or Firm* — Calfee, Halter, & Griswold LLP

(57) ABSTRACT

A wrap server executes operates as an API call receiver module that receives a unified API call from each of the one or more external systems, an API call converter module that converts an API call received by the API call receiver module into an API call corresponding to the contract information on a basis of the contract table and a user name of the user as request-source information, the request-source information being an argument of an API call received by the API call receiver module, a converted API call module that calls a Web API supplied by the central system by using the API call converted by the API call converter module, and an information return module that returns information to an external system that called the wrap server, the information being returned by an API call from the converted API call module to the central system.

3 Claims, 5 Drawing Sheets

| API call request-source | Contract start date | Contract end date | Contract information |
|---|---|---|---|
| User A (external system A) | 2017/01/01 | 2017/12/31 | Type A |
| User B (external system B) | 2017/06/01 | 2018/05/31 | Type B |
| ... | ... | ... | ... |

17a: Contract table

FIG.4

INFORMATION PROCESSING SYSTEM AND INFORMATION PROCESSING METHOD

INCORPORATION BY REFERENCE

This application claims the benefit of Japanese Priority Patent Application JP 2017-227402 filed Nov. 28, 2017, the entire contents of which are incorporated herein by reference.

FIELD

The present disclosure relates to an information processing system that uses a wrap server, and an information processing method.

BACKGROUND

In order for a client terminal to realize unified access to a plurality of different systems being the center, there is known a configuration in which a wrap server is provided between the client terminal and the plurality of systems.

SUMMARY

It is desirable to provide an information processing system and an information processing method capable of, by the wrap server, supplying not only a function supplied by the systems being the center but also a new independent function.

According to an embodiment of the present disclosure, there is provided an information processing system, including:
 a wrap server;
 a central system; and
 one or more external systems in association with the central system via the wrap server,
 the wrap server, the central system, and the one or more external systems being connected to a network,
 the wrap server including
  a communication device capable of communicating with the central system and the one or more external systems,
  a storage device that stores a contract table that describes contract information between a manager of the central system and a user who uses the central system via any one of the one or more external systems and via the wrap server, and
  a controller circuit,
  when the controller circuit of the wrap server executes an information processing program, the controller circuit operating as
   an API call receiver module that receives a unified API call from each of the one or more external systems,
   an API call converter module that converts an API call received by the API call receiver module into an API call corresponding to the contract information on a basis of the contract table and a user name of the user as request-source information, the request-source information being an argument of an API call received by the API call receiver module,
   a converted API call module that calls a Web API supplied by the central system by using the API call converted by the API call converter module, and
   an information return module that returns information to an external system that called the wrap server, the information being returned by an API call from the converted API call module to the central system.

According to an embodiment of the present disclosure, there is provided an information processing method for an information processing system including
 a wrap server,
 a central system, and
 one or more external systems in association with the central system via the wrap server,
 the wrap server, the central system, and the one or more external systems being connected to a network,
 the information processing method including, by the wrap server:
  receiving a unified API call from each of the one or more external systems;
  converting a received API call into an API call corresponding to the contract information on a basis of a contract table that describes contract information between a manager of the central system and a user who uses the central system via any one of the one or more external systems and via the wrap server, and a user name of the user as request-source information, the request-source information being an argument of a received API call;
  calling a Web API supplied by the central system by using the converted API call; and
  returning information to an external system that called the wrap server, the information being returned by an API call to the central system.

These and other objects, features and advantages of the present disclosure will become more apparent in light of the following detailed description of best mode embodiments thereof, as illustrated in the accompanying drawings.

BRIEF DESCRIPTION OF FIGURES

FIG. 4 shows an example of the contract table 17a; and

DETAILED DESCRIPTION

Hereinafter, an embodiment of the present disclosure will be described with reference to the drawings.

[Entire Configuration]

Figure 1:
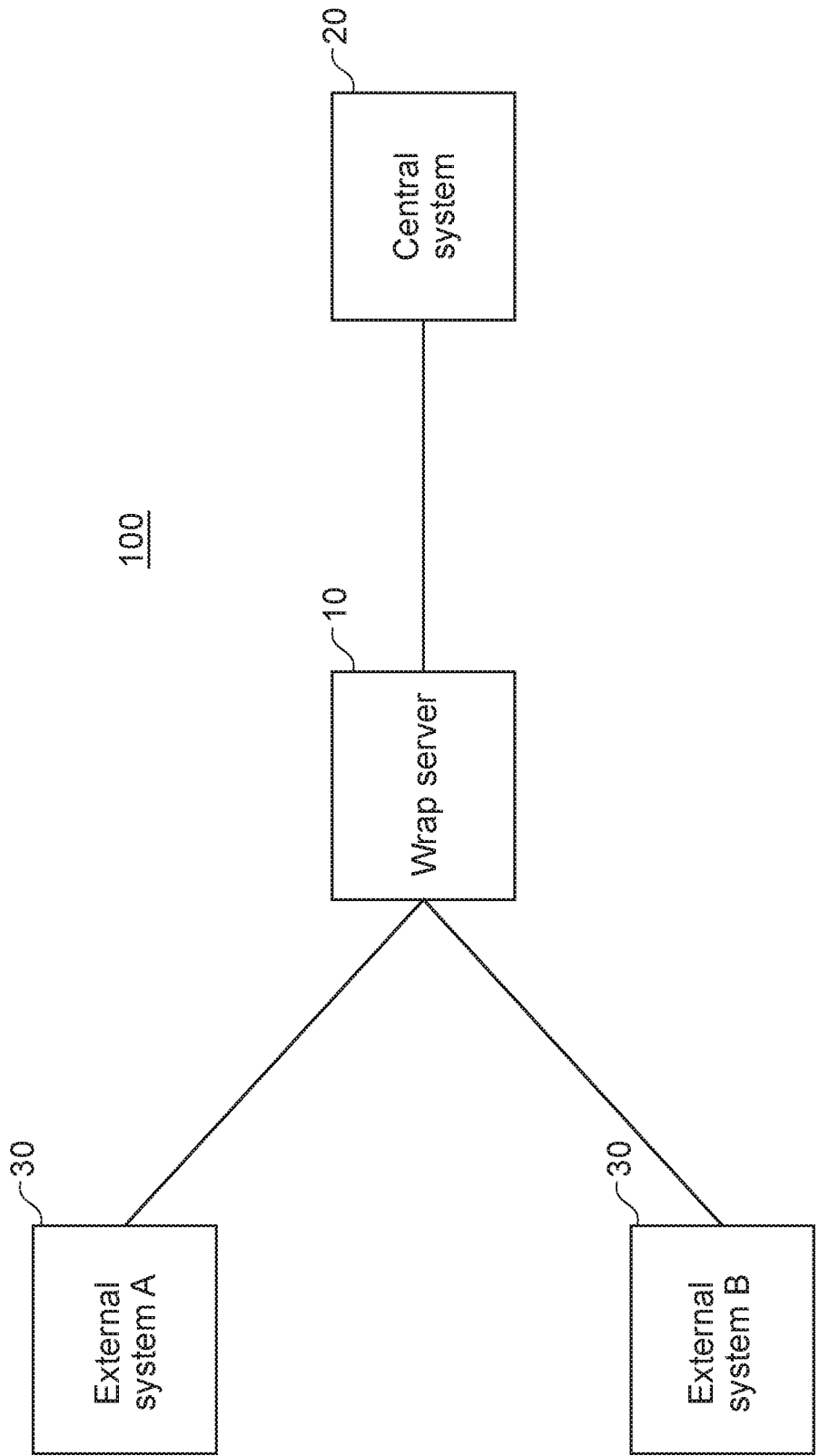
FIG. 1 shows an entire configuration of the information processing system 100 according to an embodiment of the present disclosure.

Firstly, entire configuration of the information processing system 100 according to an embodiment of the present disclosure will be described. FIG. 1 shows an entire configuration of the information processing system 100 according to an embodiment of the present disclosure.

The information processing system 100 includes the wrap server 10, the central system 20 being the center of the information processing system 100, and the one or more external systems 30, which are connected to a network.

The central system 20 supplies open Web API (Application Programming Interface) as means for being in association with the external systems 30 via the wrap server 10.

The Web API may be used with an account of the central system 20. However, returned information may be different depending on contract information between a management firm that manages the central system 20 and a user (Web API user) who accesses the central system 20 via the external system 30.

However, if the central system 20 stores contract information with a user and generates different information returned by Web API on the basis of contract information, it is necessary to:

(1) manage, by the central system 20, contract information with a user or behaviors of Web API on the basis of a contract; and (2) update the central system 20 as well when the contract is updated.

For example, the central system 20 executes major updating every six months and patch release (mainly, bug fixes) every month. However, if it is necessary to update the central system 20 when updating a contract, it is necessary to match the contract update date and the update date. It is extremely burdensome to update and operate the central system 20.

In view of the aforementioned circumstances, according to the present disclosure, the wrap server 10 changes associated data on the basis of a contract with a user without affecting the central system 20.

As shown in FIG. 1, the wrap server 10 is provided between the external system 30 used by a user and the central system 20. The wrap server 10 supplies open unified Web API to the external system 30.

The wrap server 10 manages contract information with a user and behaviors of Web API on the basis of the contract information.

The entire configuration of the information processing system 100 according to an embodiment of the present disclosure has been described above.

[Outline of Process]

Figure 2:
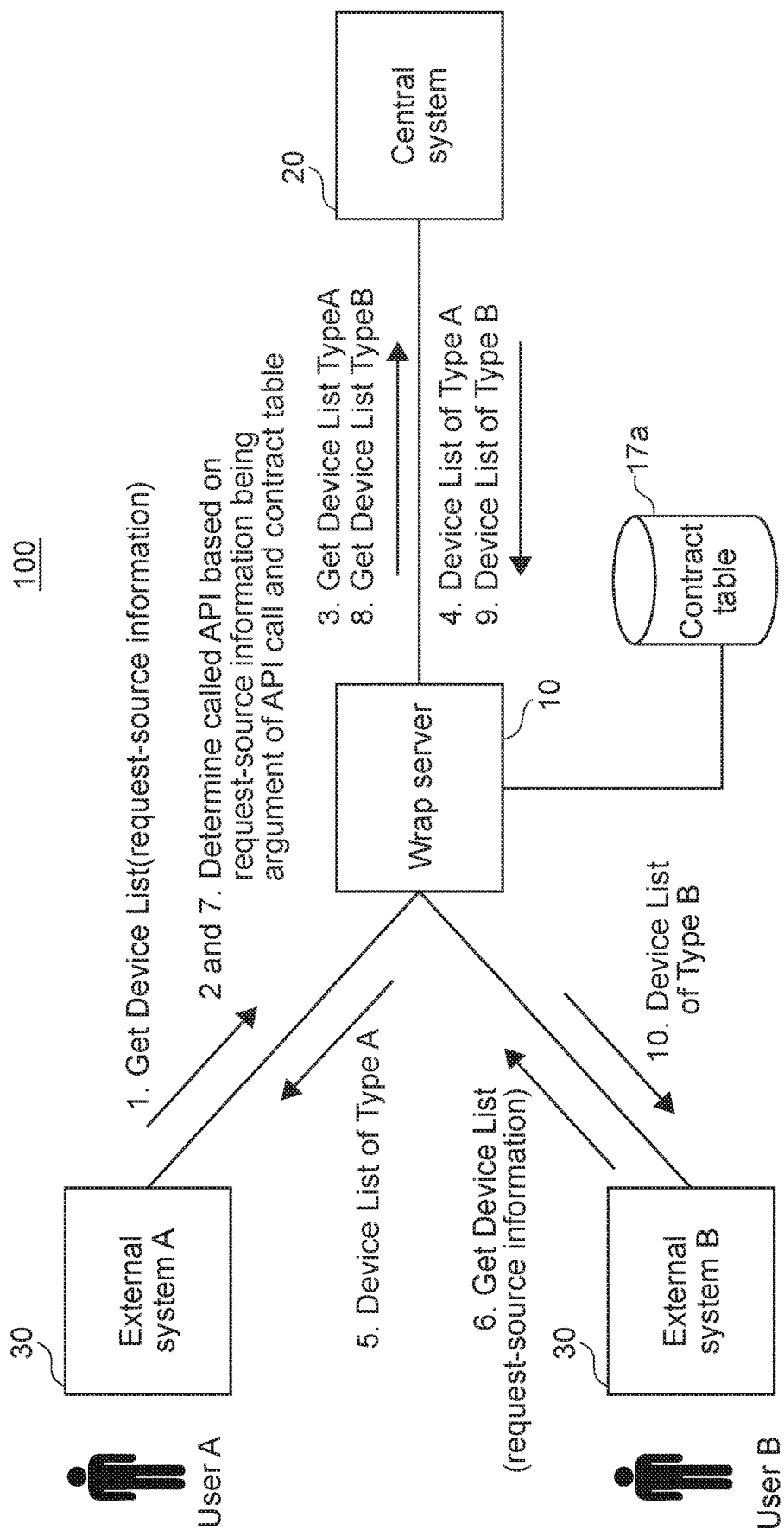
FIG. 2 illustrates an outline of process executed by the information processing system 100 will be described by means of API call, for example.

Next, an outline of process executed by the information processing system 100 will be described by means of API call, for example. FIG. 2 illustrates an outline of process executed by the information processing system 100 will be described by means of API call, for example.

(1) Firstly, the user A calls, via the external system A, Web API "Get Device List" supplied by the wrap server 10 for returning a list of devices managed by the central system 20. Note that, when calling "Get Device List", the external system A sets request-source information indicating the user A as an argument parameter.

(2) Next, the wrap server 10 refers to the contract table 17*a* that describes the request-source information being an argument of an API call and a contract with the user A, and determines an API ("Get Device List Type A") called for the central system 20.

(3) Next, the wrap server 10 calls "Get Device List Type A" Web API.

(4) Next, the central system 20 returns Device List of Type A.

(5) Next, the wrap server 10 returns Device List of Type A to the external system A.

(6) Next, the user B calls, via the external system B, Web API "Get Device List". Note that, when calling "Get Device List", the external system B sets request-source information indicating the user B as an argument parameter.

(7) Next, the wrap server 10 refers to the contract table 17*a* that describes the request-source information being an argument of an API call and a contract with the user B, and determines an API ("Get Device List Type B") called for the central system 20.

(8) Next, the wrap server 10 calls "Get Device List Type B" Web API.

(9) Next, the central system 20 returns Device List of Type B.

(10) Next, the wrap server 10 returns Device List of Type B to the external system B.

Note that the returned information of Device List of Type A is different from the returned information of Device List of Type B.

As described above, if the external system A and the external system B call the same "Get Device List" Web API, the wrap server 10 generates different Web APIs called for the central system 20 depending on request-source information being an argument.

The wrap server 10 has "request-source information" as one of arguments of the open Web API supplied to the external systems 30, which is important.

An outline of process executed by the information processing system 100 has been described above by means of API call, for example.

[Effects]

As described above, according to the present disclosure, the open Web API supplied by the wrap server 10 to the external systems 30 is a unified Web API without depending on contracts with users.

Further, only the wrap server 10 changes process depending on contracts with users. As a result, update schedule of the central system 20 is not affected by contracts with users.

[Configuration of Wrap Server]

Figure 3:
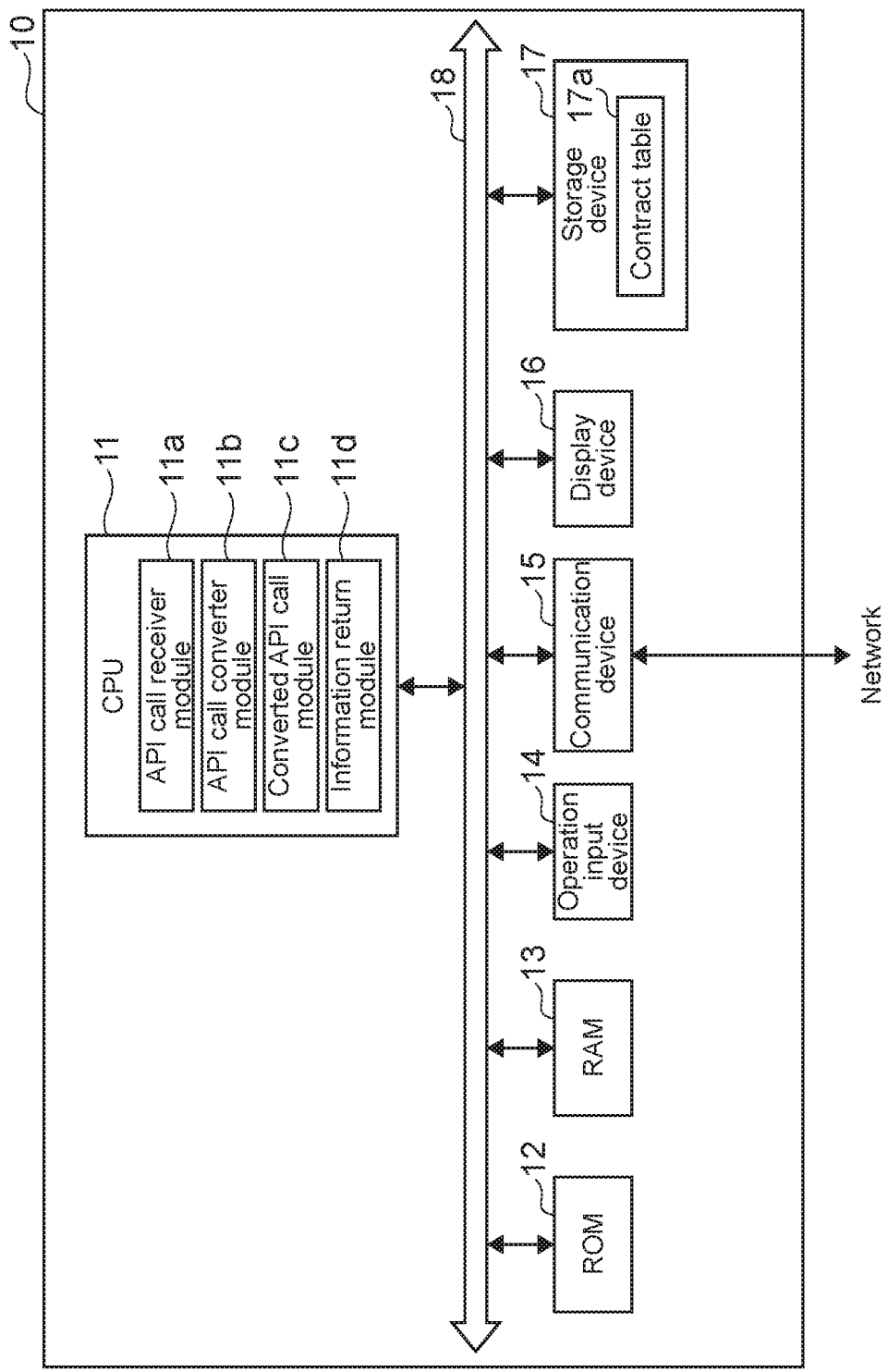
FIG. 3 shows a configuration of the wrap server 10.

Next, a configuration of the wrap server 10 will be described. The wrap server 10 may include dedicated hardware or software or a typical computer. FIG. 3 shows a configuration of the wrap server 10.

As shown in FIG. 3, the wrap server 10 includes a CPU (Central Processing Unit) 11, a ROM (Read Only Memory) 12, a RAM (Random Access Memory) 13, an operation input device 14, a communication device 15 (second communication device), a display device 16, a storage device 17, and these blocks are connected to each other via a bus 18.

The ROM 12 stores a plurality of programs such as firmware for executing various types of process, and data. The RAM 13 is used as a work area of the CPU 11 and temporarily stores an OS (Operating System), various applications being executed, and various types of data being processed.

The storage device 17 is, for example, an HDD (Hard Disk Drive), a flash memory, or other nonvolatile memories. The storage device 17 stores the OS, various applications, various types of data, and the contract table 17*a*. The contract table 17*a* will be described later.

The communication device 15 is connected to a network for sending/receiving information to/from the external system 30, the central system 20, and the like.

Of the plurality of programs stored in the ROM 12 or the storage device 17, the CPU 11 loads a program in the RAM 13 in response to a command input via the operation input device 14, and appropriately controls the display device 16 and the storage device 17 according to the loaded program.

The operation input device 14 is, for example, a pointing device such as a mouse, a keyboard, a touch panel, or other operation devices.

The display device 16 is, for example, a liquid crystal display, an EL (Electro-Luminescence) display, or a plasma display.

Next, functional blocks will be described. When the CPU 11 executes a program, the CPU 11 operates as the functional blocks described below.

The functional blocks that the CPU 11 of the wrap server 10 realizes are the API call receiver module 11*a*, the API call converter module 11*b*, the converted API call module 11*c*, and the information return module 11*d*.

The API call receiver module 11*a* receives a unified API call from each of the external systems 30.

The API call converter module 11b converts an API call received by the API call receiver module 11a into an API call corresponding to the contract information on a basis of the contract table 17a that describes a contract with a user, and a user name as request-source information, the request-source information being an argument of an API call received by the API call receiver module 11a.

The converted API call module 11c calls a Web API supplied by the central system 20 by using the API call converted by the API call converter module 11b.

The information return module 11d returns information to an external system 30 that called the wrap server 10, the information being returned by an API call from the converted API call module 11c to the central system 20.

A configuration of the wrap server 10 has been described above.

[Contract Table]

Next, an example of the contract table 17a will be described. FIG. 4 shows an example of the contract table 17a.

The contract table 17a describes contract information between a manager of the central system 20 and a user who uses the central system 20 via any one of the external systems 30 and via the wrap server 10.

As shown in FIG. 4, for example, the contract table 17a describes items such as an API call request-source, contract start date, contract end date, and contract information.

For example, the contract start date is Jan. 1, 2017, the contract end date is Dec. 31, 2017, and the contract information is "Type A" for the user A who uses the central system 20 via the external system A.

If the user A uses the unified Web API supplied by the wrap server 10, the user A uses "the user A" as the request-source information.

The API call converter module 11b searches the API call request-source item of the contract table 17a for the user A. Since the contract information of the user A is Type A, the API call converter module 11b issues the Web API call of Type A to the central system 20.

An example of the contract table 17a has been described above.

[Processing Flow of Wrap Server]

Figure 5:
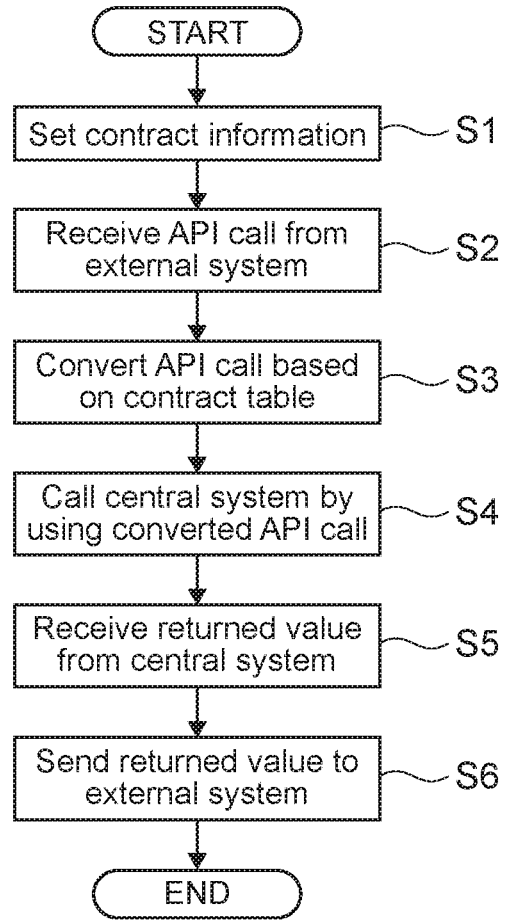
FIG. 5 shows a processing flow of the wrap server 10.

Next, a processing flow of the wrap server 10 will be described. FIG. 5 shows a processing flow of the wrap server 10.

Firstly, every time a contract between a user and a manager of the central system 20 is updated, the manager updates the contract table 17a (Step S1).

Next, the API call receiver module 11a receives the unified API call from the external system 30 (Step S2).

Next, the API call converter module 11b converts an API call received by the API call receiver module 11a on a basis of the contract table 17a and request-source information, the request-source information being an argument of an API call received by the API call receiver module 11a (Step S3).

Next, the converted API call module 11c calls a Web API supplied by the central system 20 by using the API call converted by the API call converter module 11b (Step S4).

Next, the information return module 11d receives a returned value (returned information) from the central system 20 (Step S5).

Next, the information return module 11d returns the information received from the central system 20 to the external system 30 that called the wrap server 10 (Step S6).

A processing flow of the wrap server 10 has been described above.

[Conclusion]

In order for a client terminal to realize unified access to a plurality of different systems being the center, there is known a configuration in which a wrap server is provided between the client terminal and the plurality of systems.

However, such a wrap server do not newly supply an independent function, which is supplied not by the systems being the center, to the client terminal.

To the contrary, according to the information processing system 100 of the embodiment of the present disclosure, the API call receiver module 11a receives the unified API call from the external system 30 (Step S2). Next, the API call converter module 11b converts an API call received by the API call receiver module 11a on a basis of the contract table 17a and request-source information, the request-source information being an argument of an API call received by the API call receiver module 11a (Step S3).

Therefore, the wrap server 10 changes associated data on the basis of a contract with a user without affecting the central system 20. As a result, the wrap server is capable of supplying not only a function supplied by the systems being the center but also a new independent function.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system, comprising:
   a wrap server;
   a central system; and
   one or more external systems in association with the central system via the wrap server,
   the wrap server, the central system, and the one or more external systems being connected to a network,
   the wrap server including
      a communication device capable of communicating with the central system and the one or more external systems,
      a storage device that stores a contract table that describes contract information between a manager of the central system and a user who uses the central system via any one of the one or more external systems and via the wrap server, and
      a controller circuit,
   when the controller circuit of the wrap server executes an information processing program, the controller circuit operating as
      an API call receiver module that receives a unified API call from each of the one or more external systems,
      an API call converter module that converts an API call received by the API call receiver module into an API call corresponding to the contract information on a basis of the contract table and a user name of the user as request-source information, the request-source information being an argument of an API call received by the API call receiver module,
      a converted API call module that calls a Web API supplied by the central system by using the API call converted by the API call converter module, and
      an information return module that returns information to an external system that called the wrap server, the information being returned by an API call from the converted API call module to the central system.

2. The information processing system according to claim 1, wherein the API call converter module converts the unified API call into an API call different for each request-source information.

3. An information processing method for an information processing system including
a wrap server,
a central system, and
one or more external systems in association with the central system via the wrap server,
the wrap server, the central system, and the one or more external systems being connected to a network,
the information processing method comprising, by the wrap server:
  receiving a unified API call from each of the one or more external systems;
  converting a received API call into an API call corresponding to the contract information on a basis of a contract table that describes contract information between a manager of the central system and a user who uses the central system via any one of the one or more external systems and via the wrap server, and a user name of the user as request-source information, the request-source information being an argument of a received API call;
  calling a Web API supplied by the central system by using the converted API call; and
  returning information to an external system that called the wrap server, the information being returned by an API call to the central system.

\* \* \* \* \*